Feb. 25, 1941.  F. A. WARD  2,233,188
MULTIMOTORED VEHICLE DRIVING UNIT
Filed Aug. 29, 1938   5 Sheets-Sheet 2
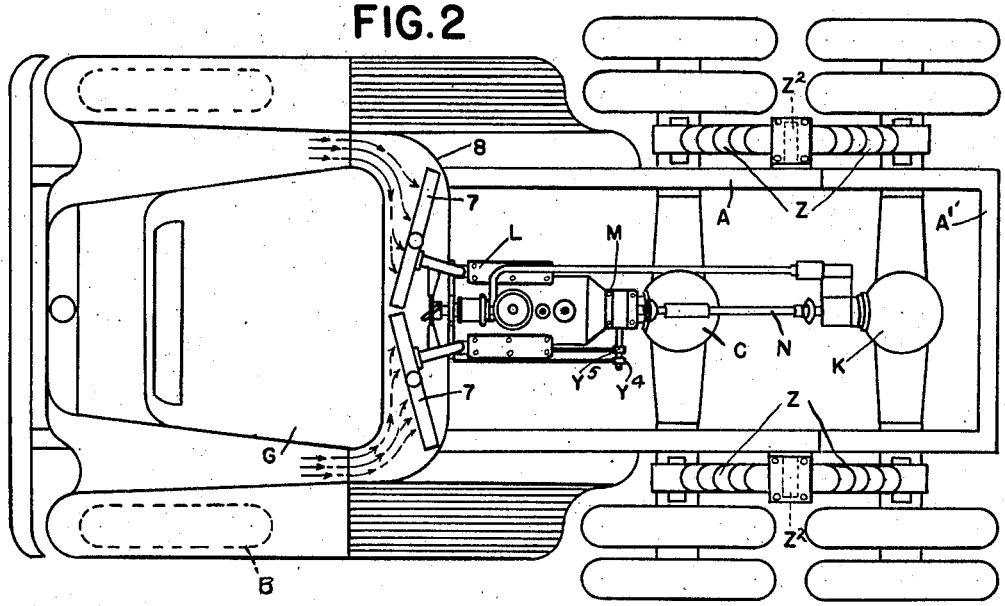
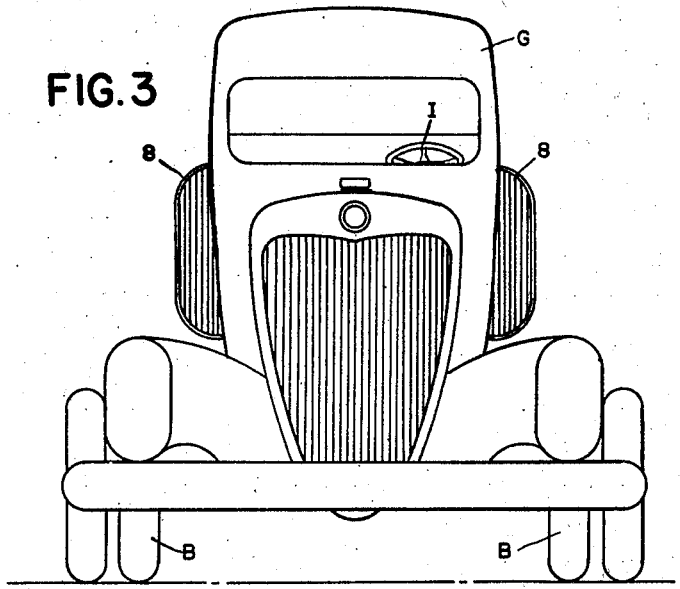
INVENTOR
FREDERICK A. WARD
BY
Whittemore Hulbert + Belknap
ATTORNEYS.

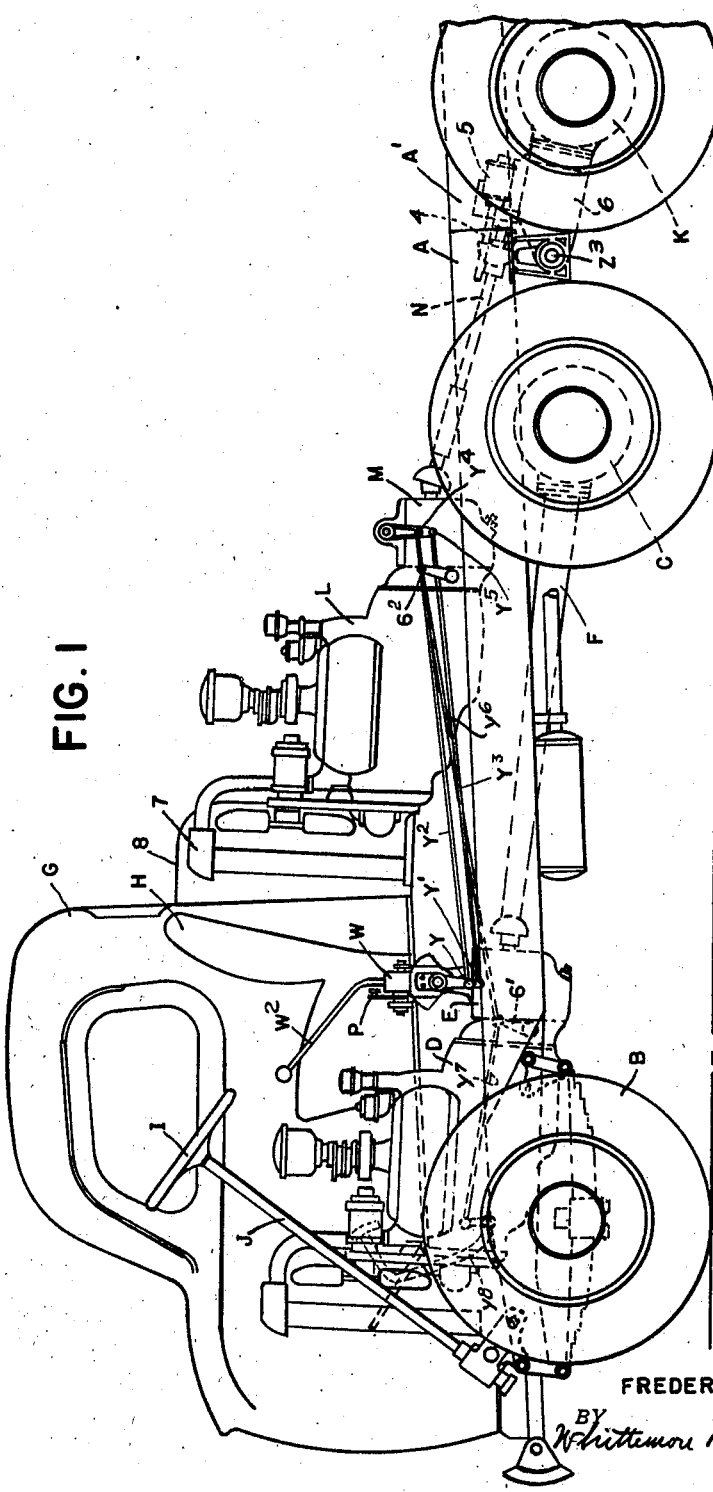

Feb. 25, 1941.  F. A. WARD  2,233,188
MULTIMOTORED VEHICLE DRIVING UNIT
Filed Aug. 29, 1938  5 Sheets-Sheet 3

INVENTOR
FREDERICK A. WARD
BY
Whittemore Hulbert & Belknap
ATTORNEYS

Feb. 25, 1941.  F. A. WARD  2,233,188
MULTIMOTORED VEHICLE DRIVING UNIT
Filed Aug. 29, 1938   5 Sheets-Sheet 4
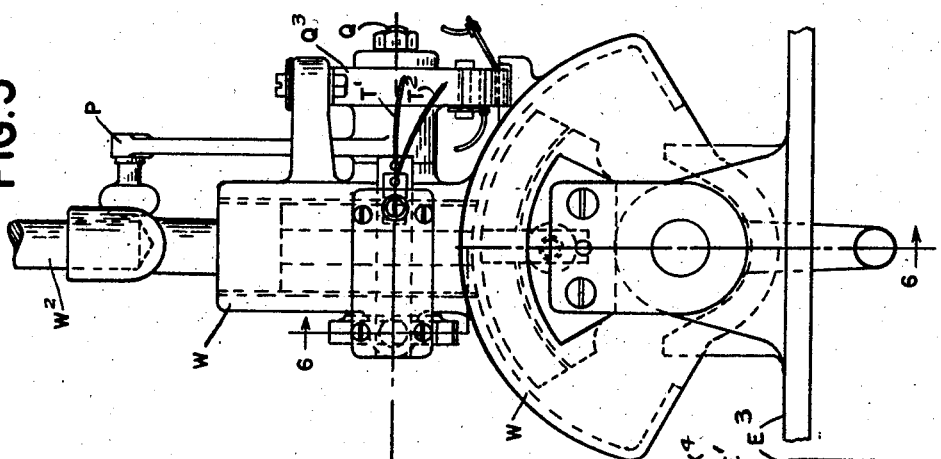
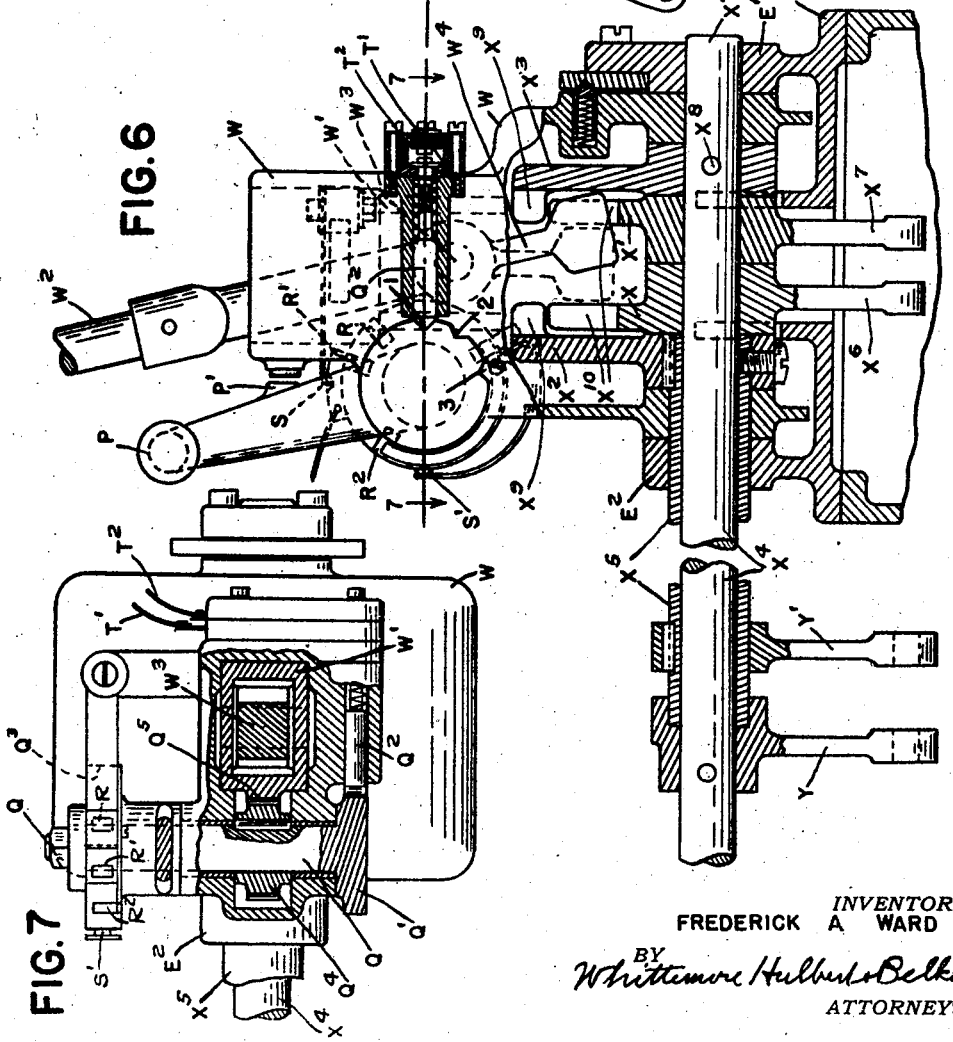
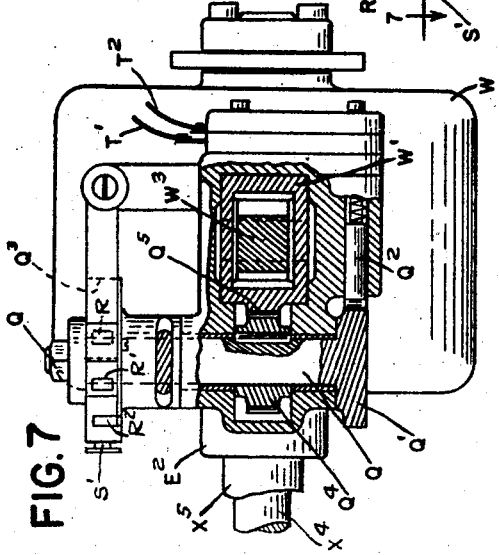
INVENTOR
FREDERICK A. WARD
BY Whittemore Hulbert & Belknap
ATTORNEYS Feb. 25, 1941.   F. A. WARD   2,233,188
MULTIMOTORED VEHICLE DRIVING UNIT
Filed Aug. 29, 1938   5 Sheets-Sheet 5

INVENTOR
FREDERICK A. WARD
BY
*Whittemore Hulbert & Belknap*
ATTORNEYS

Patented Feb. 25, 1941

2,233,188

UNITED STATES PATENT OFFICE 2,233,188

MULTIMOTORED VEHICLE DRIVING UNIT

Frederick A. Ward, Highland Park, Mich., assignor to Gear Grinding Machine Company, Detroit, Mich., a corporation of Michigan Application August 29, 1938, Serial No. 227,439

4 Claims. (Cl. 180—22)

In the operation of trucks and other commercial motor vehicles, the amount of power required varies greatly, both by reason of variation in the amount of load carried and also by road conditions. Therefore, to adapt such a vehicle for meeting all conditions it must be either overpowered or provided with a relatively large range of variation in torque ratio. A high powered motor is objectionable as it increases the cost of operation under average conditions. Also, it is objectionable to operate a vehicle on the highway at a much lower speed than that of other vehicles. Furthermore, both the original cost and that for maintenance is increased in proportion to the motor power.

It is the object of my invention to obtain a construction of vehicle driving unit which is better adapted for use under varying conditions. This I have accomplished by providing a plurality of independent motors suitably connected with the vehicle running gear, together with a control mechanism by which said motors may be operated either alternatively or in unison. A further feature of the invention is that the vehicle may be controlled by a standard gear shift and clutch pedal, the manipulation of which is the same whether either or both of the motors are in operation. Thus, an operator accustomed to the driving of a standard truck, requires no additional skill to manipulate the improved construction.

My improvements are particularly adapted for the conversion of a relatively low powered truck or motor vehicle into a construction suitable for greater loads and steeper grades. Thus, I utilize the motor and running gear of such low powered truck and supplement the same with an additional motor and the control mechanism. Preferably, this addition also includes a second driving axle to which the second motor is connected, and as above stated the controls are such that either or both motors may be operated by standard means.

While my improvements are applicable to various types of trucks and motor vehicles, I shall illustrate and describe the same in connection with a single type.

In the drawings:

Figure 1 is a sectional elevation of a truck provided with my improved multimotored driving unit;

Figure 2 is a plan view thereof;

Figure 3 is an end elevation;

Figure 5 is a side elevation of the transmission control for the driving mechanisms of either or both motors;

Figure 6 is a sectional elevation in a plane transverse to that of Figure 5;

Figure 7 is a plan view;

As illustrated, A is the chassis frame of a motor truck provided with forward wheels B, a rear driving axle C, a motor D including a clutch, transmission E and propellor shaft housing F, all of usual construction. G is the cab containing the driver's seat H, the steering wheel I, the post J and other necessary and usual equipment. In rear of the driving axle C is a rearward extension A' of the chassis frame to which is attached a second driving axle K. L is a second motor which if desired may be a duplicate of the motor D, and which is arranged above the frame A just in rear of the cab G. This motor is provided with a transmission gearing M and a propeller shaft N forming the driving connection to the rear axle K. Each motor is also provided with a starter, not illustrated in detail, and which is controlled by mechanism hereinafter described.

With the construction as thus far described, it is obvious that the vehicle may be propelled either by the motor D and its connections with the axle C, or by the motor L and its connections with the axle K. Where the vehicle is used for hauling exceptionally heavy loads or for ascending steep grades, both motors and driving axles may be used in unison. On the other hand, for lighter loads and lesser grades a single motor and driving axle may be sufficient, in which case the motors and driving axles may be used alternatively. It is, however, essential that means should be provided for quickly selecting the motors to be operated, and also for controlling the speed ratios of the transmissions connected therewith. If both motors are simultaneously operated, the speed ratios should be the same in both transmissions. Also, both motors must be under clutch control for coupling or uncoupling the same to their respective vehicle driving mechanisms. I have, therefore, provided a selective control mechanism of the following construction.

Motor selecting means

Figure 4:
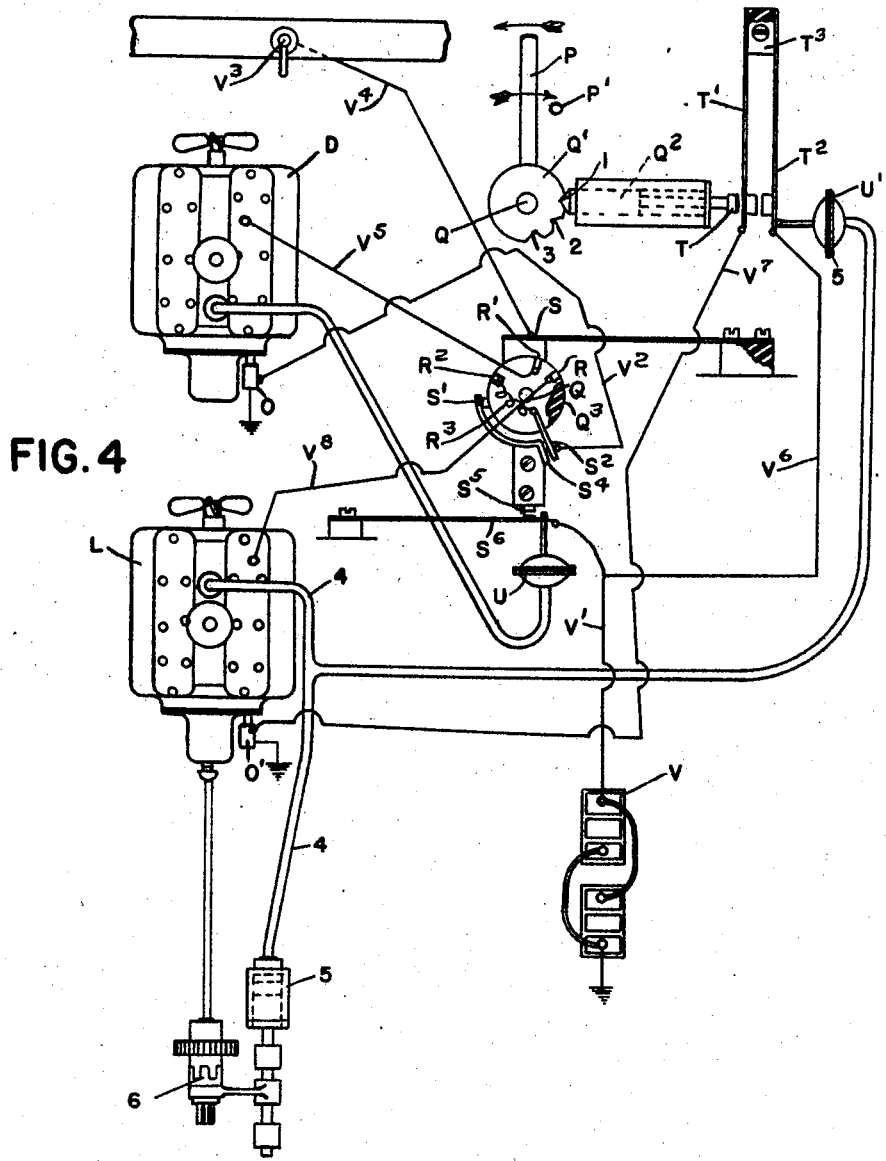
Figure 4 is a diagram illustrating the control mechanism through which the motors may be selectively operated.
Figures 8, 9:
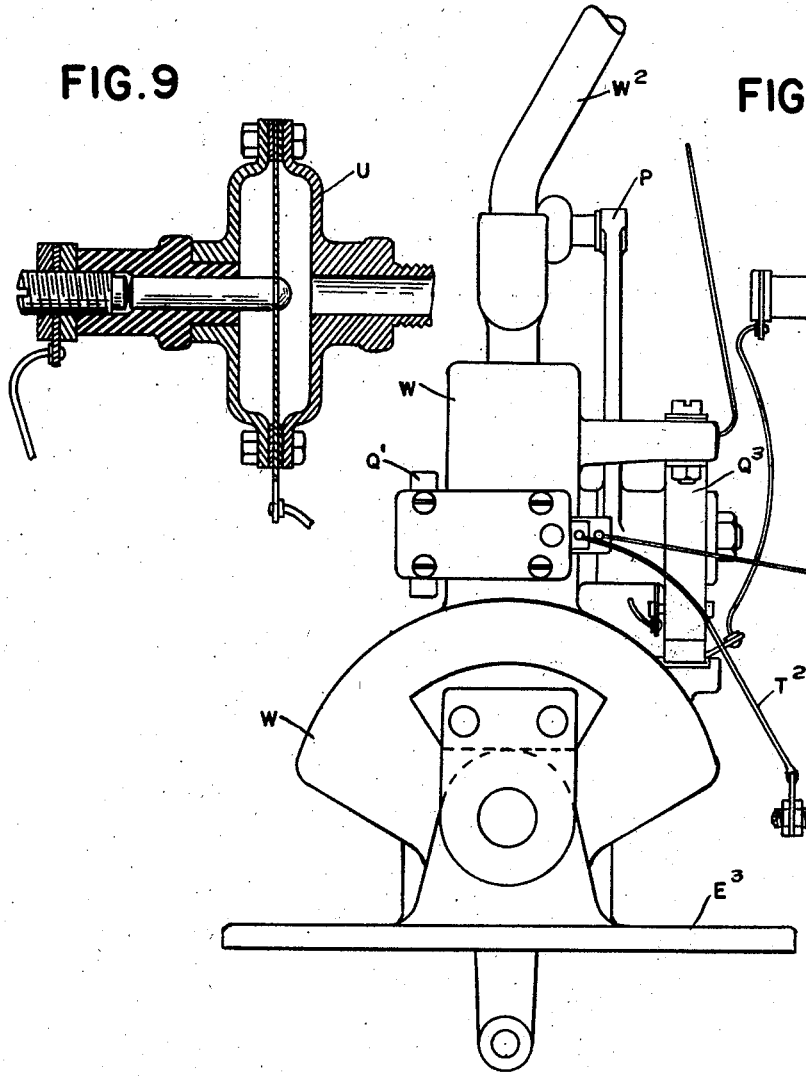
Figure 8 is an elevation similar to Figure 5 showing the suction motors and connections.
Figure 9 is a central section through one of the suction motors.

As diagrammatically illustrated in Figure 4, the forward motor D and rear motor L are each provided with a starter as indicated at O and O'. These starters are controlled by a single selector lever P, which is capable of being moved into various positions. The position illustrated in Figure 4 is where both motors are out of operation and where the starters O and O' are each in open circuit. The lever P is connected to a rock-shaft Q which has mounted thereon a disk Q' having in its periphery a series of notches 1, 2 and 3. These notches are adapted for alternative engagement with a spring pressed plunger or latch member Q², which retains the lever in the desired position of adjustment. Also mounted on the shaft Q is an insulator disk Q³ having mounted thereon a series of peripheral electrical contacts R, R' and R². S is a spring pressed contact for cooperating with the contacts R and R' and S' is a contact for cooperating with the contact R². There is also a contact member S² mounted on the disk Q³ which is electrically connected by the conductor R³ with the contact R² and is adapted in a certain position of said disk to engage a contact S⁴ electrically connected with the contact S'. The plunger Q² has a shank provided with an insulator button T for operating a resilient contact member T' to move the same into connection with a cooperating resilient contact member T², said resilient members being mounted upon an insulator block T³. The contact member S⁴ has an extension S⁵ which is normally in connection with the spring contact member S⁶. The latter member is adapted to be actuated by a suction motor U connected to the manifold of the motor D and through which the motor when started, will break connection between the contacts S⁶ and S⁵. A similar suction device U' connected to the manifold of the motor L is adapted to separate the contact T² from the contact T' when the motor L is in operation.

The construction just described is merely a diagrammatic representation of a controlling means which functions as follows:

When the lever P is moved to the right, Figure 4, until limited by the stop P', this will move the contact S² against the contact S⁴ completing an electric circuit from the battery or generator V through a conductor V' and closed contacts S⁶, S⁵ to the contact S⁴ and through the contact S² and conductor V² to the starting motor O for the motor D. At the same time ignition current is furnished to the motor D from a switch V³ on the instrument board conductor V⁴ to the contact S and through the contact R' and conductor V⁵ to the spark plugs of the motor. This will start the motor, whereupon the manifold vacuum communicated to the suction motor U will withdraw the contact S⁶ from the contact S⁵, thereby breaking the starting circuit. The motor D will then continue to operate and through its connections to drive the car, but the motor L remains inactive.

To start the motor L the lever P is moved to the left, Figure 4, until the plunger Q² engages the notch 2. The movement of the plunger will press the insulator contact button T against the contact member T' and move the latter into electrical connection with the contact T². This will establish an electric circuit including the battery V, conductor V', conductor V⁶, closed contacts T², T', conductor V⁷ to the starter O' of the motor L. At the same time, the contact R will be moved into connection with the contact S which establishes the ignition circuit including the switch V³, conductor V⁴, closed contacts S and R and conductor V⁸ to the spark plugs of the motor L, thereby starting the operation of this motor.

If it is desired to cut out the motor D and to operate solely by the motor L, the lever P is moved further to the left until the spring plunger Q² engages the notch 3. This will move the contact R' out of connection with the contact S, thereby breaking the ignition circuit of said motor D, but the motor L will still continue to operate.

To reestablish the operation of the motor D while the motor L continues to operate, the lever P is moved to the right to engage the spring plunger Q² with the notch 2. This reestablishes connection between the contact S and contact R and also between the contact S' and contact R², while the fact that the motor D has been out of operation releases the suction motor U permitting the contacts S⁵ and S⁶ to close. A circuit is then established including the battery V, conductor V', closed contacts S⁶, S⁵, closed contacts S', R², conductor R³, contact S², conductor V² to the starter O, which operates to start the motor D.

To cut out the motor L, the lever P is adjusted further to the right to engage the plunger Q² with the notch 1. This separates the contact R from the contact S breaking the ignition circuit of the motor L. To cut out the motors D and L, the dash switch V³ is opened.

*Transmission control*

As has been previously described, the motor D is provided with a variable speed transmission E, and the motor L with a similar variable speed transmission M. It is essential that these transmissions should be correspondingly adjusted when both motors are in operation, and individually adjusted when their respective motors only are operated. Furthermore, it is desirable that this should be accomplished by a standard gear shift mechanism. I have, therefore, devised a construction of control mounted in connection with the transmission E for convenient operation from the driver's seat, which control alternatively operates either transmission E and M, or both simultaneously. The selection is accomplished automatically by the operation of the selector lever P, the construction being as follows. Pivotally mounted on the housing of the transmission E and projecting upward therefrom is a rockable casing W, which also constitutes a mounting for the selector lever P and its rockshaft Q. Within this casing is a vertically movable carriage W' which is actuated by a pinion Q⁴ engaging a rack Q⁵ so that for each position of adjustment of the lever P, the carriage W' has a corresponding position. W² is the gear shift lever which is pivotally mounted at W³ on the carriage W' and has a downwardly extending arm W⁴ for selective engagement with a series of rock arms. These rock arms include the arms X and X' for controlling the transmission E and the arms X² and X³ for controlling the transmission M. All of these arms are sleeved about a rockshaft X⁴ which is journaled in bearings E' and E² on the cover E³ of the housing for the transmission E. A tubular rockshaft X⁵ is sleeved on the rockshaft X⁴ and extends to the left, Figure 6. The casing W is also pivoted on these rockshafts so as to rock with the lever W² and the particular rock arms to which it is coupled. The rock arms X and X' are revoluble upon the shaft X⁴ and are provided with downwardly extending arms X⁶ and X⁷ for actuating the gear shifters of the transmission E. The rock arm X³ is coupled to the rockshaft X⁴ by a pin X⁸ and the rock arm X² is coupled to the sleeve X⁵. These rock arms X² and X³ are also provided with laterally inwardly extending forked portions X⁹ which are above forked portions X¹⁰ on the rock arms X and X'. By the arrangement just described, when the selector lever P is in a position for engaging the plunger Q² with the notch 1, the pinion Q⁴ and rack Q⁵ will hold the carriage W' in a lowered position, where the selector arm W¹ is in operative relation to the forks $X^{10}$ of the rock arms X and X'. Thus if the lever $W^2$ is moved to the left, Figure 6, the selector arm $W^4$ will engage the fork of the rock arm X', while the movement of the lever $W^2$ to the right will engage said selector arm with the fork of the rock arm X. When the lever P is in a position for engaging the plunger $Q^2$ with the notch 3, the carriage W' is in a raised position, where the selector arm $W^4$ is out of operative relation with the arms X and X' and in operative relation to the forks $X^9$ of the rock arms $X^2$ and $X^3$. If, however, the lever P is in its intermediate position where the plunger $Q^2$ engages the notch 2, then the selector arm $W^4$ is in position to simultaneously engage the forks of the arms X' and $X^3$, when the lever $W^2$ is moved to the left, and to simultaneously engage the forks of the levers X and $X^2$ when the lever $W^2$ is moved to the right. The shaft $X^4$ and tubular shaft $X^5$ are provided with rock arms Y and Y' which are connected respectively by the rods $Y^2$ and $Y^3$ with gear shifter actuating rock arms $Y^4$ and $Y^5$ for the transmission M. The clutch operating arms 6' and $6^2$ for the motors D and L are connected to each other by a rod $Y^6$ and a rod $Y^7$ connects to the usual operating pedal $Y^8$.

From the description above given, it will be obvious that the position of the selector lever P determines whether one or the other of the transmissions is individually operated by the lever $W^2$ or whether both are simultaneously operated. Consequently, the driver only needs to determine whether he requires either one or both motors to be in operation and to correspondingly actuate the selector lever P. He can then change the gear ratios by manipulation of the lever $W^2$ in the same manner as with a standard gear shift.

The chassis frame is supported on the driving axles C and K by any suitable spring suspension but as indicated in Figure 2, this includes spring walking beams Z and Z' extending to the two axles on opposite sides of the frame and pivotally secured to the latter by trunnions $Z^2$. The axle K is connected to the frame by a torque or reach arm $Z^3$ or any other suitable connection. As it is desirable to avoid driving either motor when not in operation, suitable declutching means is preferably provided. This may be either manual or, as indicated in Figure 4, may be automatic, by extending a suction conduit 4 from the intake manifold of the engine to a suction motor 5 for actuating a clutch 6. Thus, the clutch will only be engaged when the engine is in operation and suction is supplied to the motor 5.

For cooling the rear motor L the radiator 7, which is necessarily located in rear of the cab G, is enclosed by a hood 8 extending laterally beyond the cab and open at the front for air circulation. It may also be desirable to maintain both motors in condition for instantaneous operation by providing a common water circulating system. Thus, when only one motor is operating, the other will be sufficiently heated to instantaneously start and operate satisfactorily.

What I claim as my invention is:

1. A multimotored driving unit for vehicles comprising a plurality of independent motors, a running gear, a driving connection between each of said motors and said running gear including a variable ratio transmission, selective control means for starting and stopping any or all of said motors alternatively or in unison, a common ratio control means for correspondingly varying the ratios of said transmissions alternatively or in unison, and connecting means between said selective control means and ratio control means whereby only the transmission of a running engine is operated by the latter.

2. A multimotored driving unit for vehicles comprising a plurality of independent motors, a corresponding number of independent driving axles, a driving connection between each of said motors and its corresponding axle including a variable ratio transmission, selective control means for starting and stopping any or all of said motors alternatively or in unison, a common ratio control means for said transmissions, and means automatically operated by said selective control means for connecting said ratio control means to the transmission only of the motor or motors in operation.

3. A multimotored driving unit for vehicles comprising a plurality of independent combustion motors, a starter for each motor, a corresponding number of independent driving axles, a driving connection between each of said motors and its corresponding axle, including a variable ratio transmission, selective control means for starting and stopping any or all of said motors, a common ratio control means for any or all of said transmissions, and an interconnection between said selective control means and ratio control means whereby the latter will operate only the transmission of a running motor.

4. A multimotored driving unit for vehicles comprising a plurality of independent combustion motors, a starter for each motor, a corresponding number of independent driving axles, a driving connection between each of said motors and the corresponding axle, said connection including a variable ratio transmission, selective control means for starting or stopping any or all of said motors, a common ratio control means for said transmissions, an interconnection between said selective control means and ratio control means whereby the latter operates only the transmission of a running motor, and means automatically operating on the cutting out of any motor for declutching the corresponding axle from its driving connection.

FREDERICK A. WARD.